(12) United States Patent
Hasegawa et al.

(10) Patent No.: US 10,291,159 B2
(45) Date of Patent: May 14, 2019

(54) CONTROL SYSTEM, CONTROLLER, AND CONTROL METHOD FOR WOUND INDUCTION MACHINE

(71) Applicants: Kabushiki Kaisha Toshiba, Tokyo (JP); Toshiba Energy Systems & Solutions Corporation, Kawasaki-shi, Kanagawa (JP)

(72) Inventors: Ryuta Hasegawa, Hino Tokyo (JP); Takahisa Kageyama, Ichikawa Chiba (JP); Kiyoshi Kusunoki, Kawasaki Kanagawa (JP); Teruyuki Ishizuki, Toshima Tokyo (JP); Yuichi Shiozaki, Tachikawa Tokyo (JP); Takashi Fujita, Minato Tokyo (JP); Hironari Kaneda, Kawasaki Kanagawa (JP)

(73) Assignees: Kabushiki Kaisha Toshiba, Tokyo (JP); Toshiba Energy Systems & Solutions Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 15/891,398

(22) Filed: Feb. 8, 2018

(65) Prior Publication Data

US 2018/0278183 A1   Sep. 27, 2018

(30) Foreign Application Priority Data

Mar. 23, 2017   (JP) .................................. 2017-058141

(51) Int. Cl.
*H02P 1/42* (2006.01)
*H02P 6/00* (2016.01)
(Continued)

(52) U.S. Cl.
CPC ............... *H02P 6/005* (2013.01); *H02H 7/06* (2013.01); *H02H 9/041* (2013.01); *H02P 9/007* (2013.01);
(Continued)

(58) Field of Classification Search
CPC ...... H02P 1/00; H02P 1/04; H02P 1/24; H02P 1/12; H02P 1/26; H02P 1/46; H02P 3/00;
(Continued)

(56) References Cited

U.S. PATENT DOCUMENTS

| 8,811,048 B2 * | 8/2014 | Zhang ..................... H02P 27/14 363/37 |
| 9,929,636 B2 * | 3/2018 | Shinonnoto ............. H02M 1/12 |

FOREIGN PATENT DOCUMENTS

| JP | H04-207996 | 7/1992 |
| JP | H08-317694 | 11/1996 |

(Continued)

*Primary Examiner* — Antony M Paul
(74) *Attorney, Agent, or Firm* — Finnegan, Henderson, Farabow, Garrett & Dunner, L.L.P.

(57) ABSTRACT

According to one embodiment, a control system includes a chopper, a short-circuit unit, a voltage detector circuit, and a controller. The chopper reduces a direct current voltage between a converter connected to a stator in a wound induction machine and an inverter connected to a rotor in the wound induction machine. The short-circuit unit shorts a wire used for connection between the rotor and the inverter and the voltage detector circuit is to detect the direct current voltage. The controller causes driving the chopper and, at the same time, outputting from the inverter an alternating current over which a direct current component is superimposed when a voltage value exceeds a first predetermined value, and causes driving the short-circuit unit and, at the same time, halting the inverter when the voltage value exceeds a second predetermined value.

7 Claims, 6 Drawing Sheets

(51) Int. Cl.
*H02P 27/06* (2006.01)
*H02H 9/04* (2006.01)
*H02P 27/05* (2006.01)
*H02H 7/06* (2006.01)
*H02P 9/00* (2006.01)
*H02P 29/024* (2016.01)
*H02H 7/12* (2006.01)
*H02H 9/00* (2006.01)

(52) U.S. Cl.
CPC .............. *H02P 27/05* (2013.01); *H02P 27/06* (2013.01); *H02P 29/024* (2013.01); *B60L 2220/12* (2013.01); *H02H 7/12* (2013.01); *H02H 9/002* (2013.01); *H02P 2207/01* (2013.01)

(58) Field of Classification Search
CPC .... H02P 3/06; H02P 3/22; H02P 21/00; H02P 6/00; H02P 6/14; H02P 6/185; H02P 6/24; H02P 11/00; H02P 13/00; H02P 23/00; H02P 25/00; H02P 27/00; H02P 27/04; H02P 27/06; H02P 29/021; H02P 2005/4002; H02P 1/42
USPC ......... 318/400.01, 400.02, 400.14, 700, 701, 318/727, 799, 800, 801, 430, 400.31, 318/400.32; 363/40, 44, 95, 175; 361/23, 30
See application file for complete search history.

(56) References Cited

FOREIGN PATENT DOCUMENTS

| | | |
|---|---|---|
| JP | 2816020 | 8/1998 |
| JP | 2018-50446 A | 3/2018 |

\* cited by examiner

CONTROL SYSTEM, CONTROLLER, AND CONTROL METHOD FOR WOUND INDUCTION MACHINE

CROSS REFERENCE TO RELATED APPLICATION

This application is based upon and claims the benefit of priority from the prior Japanese Patent Application No. 2017-058141, filed on Mar. 23, 2017, the entire contents of which are incorporated herein by reference.

FIELD

An embodiment of the present invention relates to a control system, a controller, and a control method for a wound induction machine.

BACKGROUND

With a control system of a wound induction machine, in the event of a breakdown, such as a short-circuit, of an electric power system, a circuit breaker connected to the stator side (primary side) of the wound induction machine separates the wound induction machine from the electric power system. At this time on the stator side, the abnormal current phenomenon (so-called Current zero-missing phenomenon) in which there is no timing of when the alternating current (primary current) becomes zero may occur. In this case, an inverter connected to the rotor side of the wound induction machine (secondary side) switches to an irregular operation mode.

Accordingly, a direct current component is superimposed on an alternating current (secondary current) output from the inverter. Consequently, a timing of when the alternating current becomes zero (so-called a zero cross point) is generated on the stator side of the wound induction machine.

Besides, in the event of a breakdown of the electric power system, breakdown current may flow into the wound induction machine. In this case, a switching element used as the inverter is immediately turned off. However, if the off period of the switching element is long, the direct current voltage input to the inverter increases, which may damage the switching element. To avoid it, a chopper is operated to suppress an increase in the voltage.

If, before a breakdown occurs in the electric power system, the wound induction machine operates in such a manner that high reactive power, that is, strong excitation occurs in the leading direction when viewed from the electric power system, high breakdown current occurs upon the breakdown of the electric power system. In this case, the off period of the switching element is extended, and the direct current voltage easily increases. For this reason, to suppress such an increase in the direct current voltage, the chopper is required to be a resistor with high power consumption. If the power consumption of this resistor is high, the size and cost of the device may increase.

DETAILED DESCRIPTION

Embodiments will now be explained with reference to the accompanying drawings.

In one embodiment, a control system includes a chopper, a short-circuit unit, a voltage detector circuit, and a controller. The chopper reduces a direct current voltage between a converter connected to a stator in a wound induction machine and an inverter connected to a rotor in the wound induction machine. The short-circuit unit shorts a wire used for connection between the rotor and the inverter and the voltage detector circuit is to detect the direct current voltage. The controller causes driving the chopper and, at the same time, outputting from the inverter an alternating current over which a direct current component is superimposed when a voltage value exceeds a first predetermined value, and causes driving the short-circuit unit and, at the same time, halting the inverter when the voltage value exceeds a second predetermined value.

Figure 1:
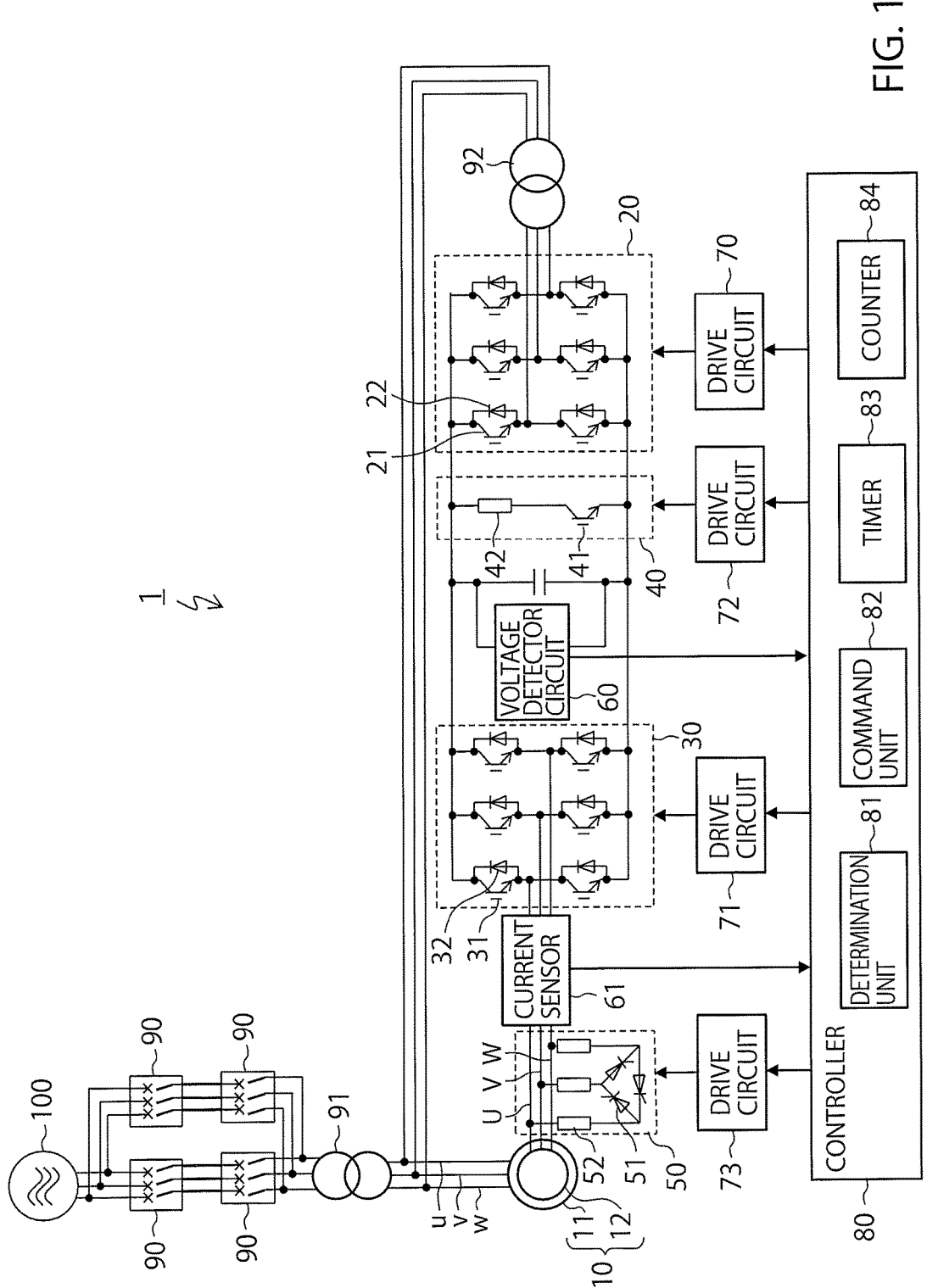
FIG. 1 is a block diagram of the configuration of a control system of a wound induction machine according to this embodiment.

FIG. 1 is a block diagram of the configuration of a control system of a wound induction machine according to this embodiment. A control system 1 shown in FIG. 1 is a system for controlling a wound induction machine 10 and includes a converter 20, an inverter 30, a chopper 40, a short-circuit unit 50, a voltage detector circuit 60, a current sensor 61, drive circuits 70 to 73, a controller 80, circuit breakers 90, a main transformer 91, and a converter transformer 92.

The wound induction machine 10 includes a stator 11 and a rotor 12. The stator 11 is connected to an electric power system 100 through the main transformer 91 and the circuit breakers 90. The rotor 12 is provided in the stator 11.

The converter 20 is connected to the stator 11. The converter 20 includes three arms for the respective phases in three-phase alternating current. Each arm includes series-connected two switching elements 21 and two diodes 22 connected in anti-parallel to the respective switching elements 21. The converter 20 converts three-phase alternating current voltage supplied from the electric power system 100 to direct current voltage. This direct current voltage, i.e., direct current link voltage is maintained by a capacitor C.

The switching element 21 may be an insulated gate bipolar transistor (IGBT) as in this embodiment, or any other type of switching element.

The inverter 30 is connected to the rotor 12. The inverter 30 and the converter 20 are included in a frequency converter which controls the frequency of the wound induction machine 10. Like the converter 20, the inverter 30 includes three arms for the respective phases in three-phase alternating current. Each arm includes series-connected two switching elements 31 and two diodes 32 connected in anti-parallel to the respective switching elements 31. Like the switching element 21, the switching element 31 may be an IGBT or any other type of switching element as described above.

When the electric power system 100 is in the normal state, each switching element 31 in the inverter 30 performs a regular switching operation. Accordingly, direct current link voltage is converted to three-phase alternating current voltage. The frequency of this alternating current voltage corresponds to a slip frequency which is a frequency gap between the rotating magnetic field generated by the stator 11 and the rpm of the rotor 12. On the contrary, in case of a breakdown of the electric power system 100, each switching element 31 in the inverter 30 performs an irregular switching operation. Accordingly, a direct current component is superimposed over the alternating current output from the inverter 30.

The chopper 40 is provided between the converter 20 and the inverter 30. The chopper 40 includes a switching element 41 (chopper switching element) and a resistor 42 (chopper resistor) series-connected to the switching element 41. If the switching element 41 is turned on, direct current flows into the resistor 42. Consequently, the direct current link voltage drops, so that the switching elements 21 and 31 can be protected. The switching element 41 may be an IGBT or any other type of switching element, such as a gate turn off (GTO) thyristor or gate commutated turn off (GCT) thyristor.

The short-circuit unit 50 includes three switching elements 51 (short-circuit switching elements) and three resistors 52 (current limit resistors). The switching elements 51 are provided between three-phase wires U, V, and W used to provide connection between the rotor 12 and the inverter 30. The resistors 52 are series-connected to the switching elements 51. If the switching elements 51 are turned on, the wires U, V, and W of the short-circuit unit 50 short, and short-circuit current flows through the short-circuit unit 50. The amount of this short-circuit current can be adjusted by the resistors 52.

The voltage detector circuit 60 detects the voltage of the capacitor C, that is, direct current link voltage. The voltage detector circuit 60 outputs, for example, the value of the voltage obtained by dividing the direct current link voltage through two resistors, to the controller 80. The current sensor 61 detects the output current of the inverter 30 and outputs the detected current value to the controller 80.

The drive circuits 70 to 73 drive the converter 20, the inverter 30, the chopper 40, and the short-circuit unit 50, respectively under control by the controller 80. To be specific, the drive circuits drive the switching elements 21, the switching elements 31, the switching element 41, and the switching elements 51.

The controller 80 includes a determination unit 81, a command unit 82, a timer 83, and a counter 84. The determination unit 81 performs various determination operations in accordance with the voltage value detected by the voltage detector circuit 60 and the current value detected by the current sensor 61. The command unit 82 sends various commands to the drive circuits 70 to 73 in according to with the determination by the determination unit 81. The timer 83 measures the down-time of the electric power system 100. The counter 84 measures number of times of occurrence of breakdown of the electric power system 100.

The circuit breakers 90 are provided between the electric power system 100 and the main transformer 91. Although multiple circuit breakers 90 are connected to the electric power system 100 in this embodiment, the number of circuit breakers 90 may be one. In case of a breakdown, such as a short-circuit, in a wire between the series-connected circuit breakers 90, any one of the multiple circuit breakers 90 is separated from the electric power system 100. The state of each circuit breaker 90 is monitored by the controller 80.

The main transformer 91 converts the primary voltage of the stator 11 side to a voltage equivalent to that of the electric power system 100. Further, the converter transformer 92 converts the primary voltage to the drive voltage of the converter 20.

The control system 1 according to this embodiment can be used for a pumped hydropower system, for example. A relationship between the operation state of a pumped hydropower system and occurrence of zero missing will now be explained with reference to FIG. 2.

Figure 2:
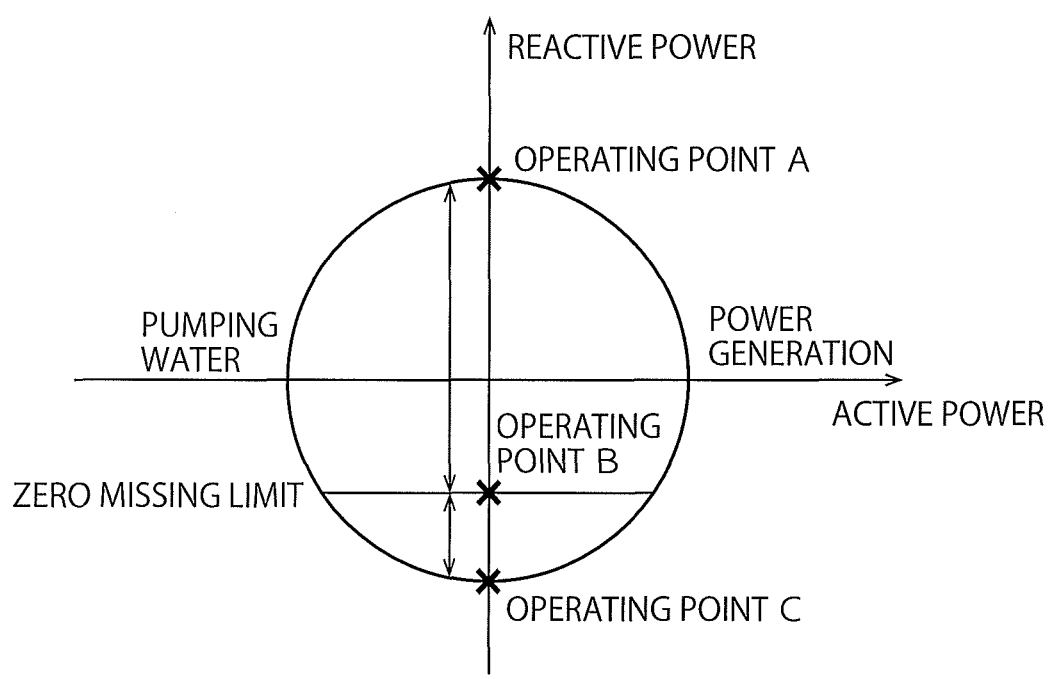
FIG. 2 shows a relationship between the operation mode of a pumped hydropower system and occurrence of zero missing.

FIG. 2 shows a relationship between the operation mode of the pumped hydropower system and occurrence of zero missing. In FIG. 2, the horizontal axis indicates active power, and the vertical axis indicates reactive power. When the electric power system 100 is in the normal state, the voltage of the wound induction machine 10 viewed from the system side is determined by the intensity of excitation. In FIG. 2, the excitation at the operating point A is the highest, and the excitation at the operating point C is the lowest.

In case of a breakdown of the electric power system 100, the breakdown current flowing into the wound induction machine 10 is determined by the intensity of excitation. At this time, in the operation mode in which the intensity of the excitation is higher than a certain limit, an alternating current component in the primary current of the stator 11 side increases, thereby preventing zero missing. This limit is hereinafter referred to as a zero missing limit.

On the contrary, if the short-circuit unit 50 operates in the operation mode in which the intensity of the excitation is lower than the zero missing limit, the wires U, V, and W are short-circuited, so that the switching elements 31 in the inverter 30 are turned off. In this case, the inverter 30 cannot output an alternating current superimposed over a direct current component. Consequently, zero missing occurs.

To avoid this phenomenon, in this embodiment, in the operation mode in which the intensity of the excitation is lower than the zero missing limit, until the voltage of the voltage detector circuit 60 exceeds a second predetermined value (which will be described later), the short-circuit unit 50 is not driven and the chopper 40 and the inverter 30 are simultaneously operated. Accordingly, the resistor 42 in the chopper 40 is set such that the voltage value detected by the voltage detector circuit 60 does not exceed the second predetermined value.

Figure 3:
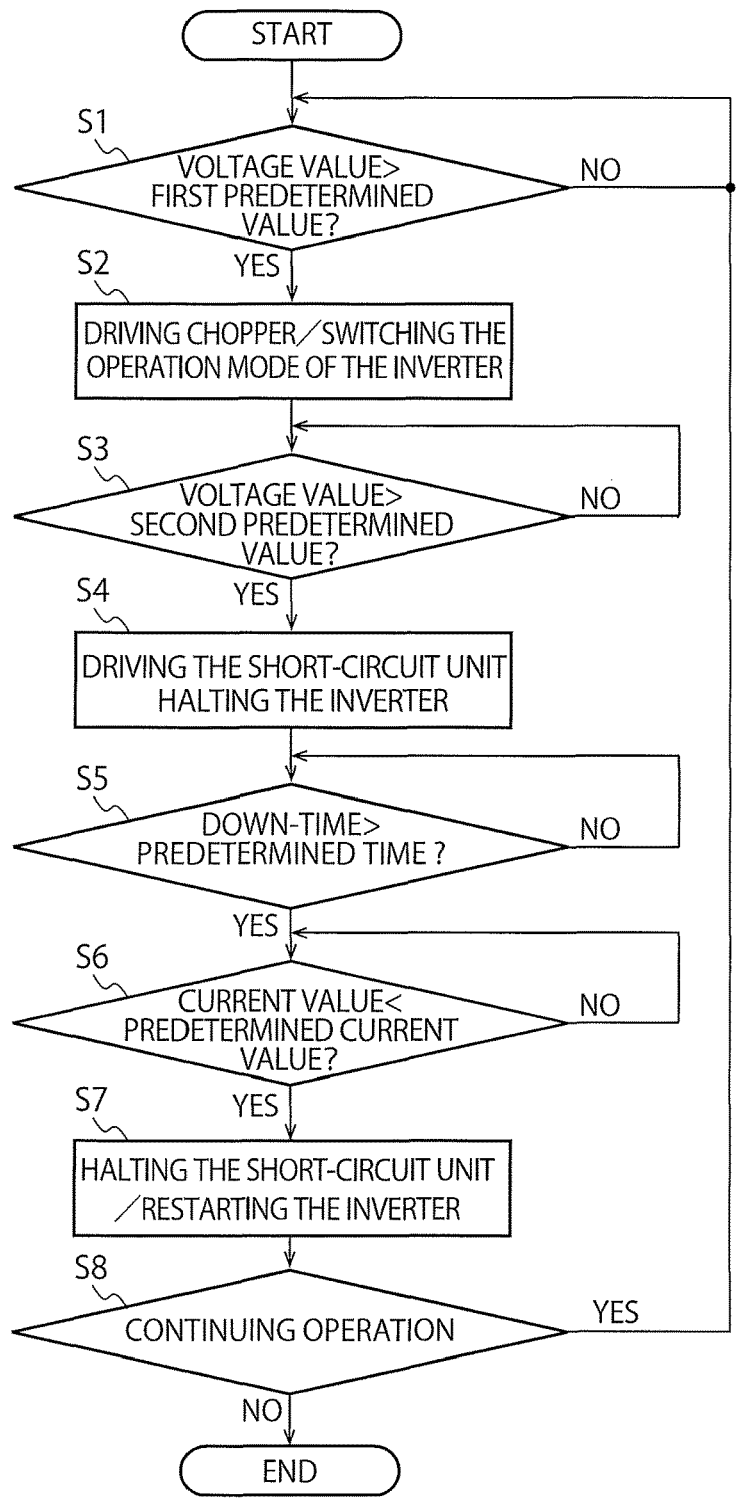
FIG. 3 is a flow chart showing the operation flow of a control system 1 in case of a breakdown of an electric power system.

How the control system 1 operates in case of a breakdown of the electric power system 100 will now be explained in detail with reference to FIG. 3. FIG. 3 is a flow chart showing the operation flow of the control system 1 in case of a breakdown of the electric power system 100.

In the electric power system 100, for example, a short-circuit occurs, the direct current link voltage increases. Thus, the voltage value detected by the voltage detector circuit 60 increases. Accordingly, the determination unit 81 in the controller 80 first determines whether the voltage value from the voltage detector circuit 60 exceeds the first predetermined value (Step S1).

If the voltage value exceeds the first predetermined value, the command unit 82 in the controller 80 instructs the drive circuit 72 to drive the chopper 40 (Step S2). The drive circuit 72 outputs a drive signal for turning on the switching element 41, in response to the instruction from the command unit 82. In addition, the command unit 82 instructs the drive circuit 71 to switch the operation mode of the inverter 30 (Step S2). The drive circuit 71 changes the switching operation of each switching element 31, in response to the instruction from the command unit 82.

For example, when a direct current component is superimposed over the current flowing through the wire U in the normal direction, the drive circuit 71 outputs a drive signal for keeping the ON states of the high-side switching elements 31 connected to the wire U and the low-side switching elements 31 connected to the wires V and W. It should be noted that the drive circuit 70 causes the inverter 30 to normally operate without changing the voltage value.

Subsequently, the determination unit 81 determines whether the voltage value exceeds the second predetermined value (Step S3). If the voltage value exceeds the second predetermined value, the command unit 82 instructs the drive circuit 73 to drive the short-circuit unit 50 (Step S4). The drive circuit 73 outputs a drive signal for turning on the switching elements 51, in response to the instruction from the command unit 82. In addition, the command unit 82 instructs the drive circuit 71 to halt the inverter 30 (Step S4). The drive circuit 71 outputs a drive signal for turning off all the switching elements 31, in response to the instruction from the command unit 82. In Step S4, the chopper 40 continues operating.

Subsequently, the determination unit 81 determines whether the down-time exceeds a predetermined time (Step S5). The down-time is measured by the timer 83 in the controller 80. The timer 83 starts to measure time at the start-up of the short-circuit unit 50. If the down-time is short, there is a possibility that the down point is not removed by the circuit breaker 90, the direct current link voltage increases again when the short-circuit unit 50 is released, the short-circuit unit 50 starts again, and continuous operation therefore becomes difficult. Accordingly, in Step S5, the determination unit 81 checks the down-time.

If the down-time exceeds the predetermined time, the determination unit 81 determines whether the current value detected by the current sensor 61 is below a predetermined current value (Step S6). The predetermined current value is determined by the current tolerance of the inverter 30.

If the current value is below the predetermined current value, the command unit 82 instructs the drive circuit 73 to halt the short-circuit unit 50 (Step S7). The drive circuit 73 outputs a drive signal for turning off all the switching elements 51, in response to the instruction from the command unit 82. In addition, the command unit 82 instructs the drive circuit 71 to restart the inverter 30 (Step S7). The drive circuit 71 drives each switching element 31 in the normal operation mode, in response to the instruction from the command unit 82.

In the short-circuit unit 50 of this embodiment, the resistors 52 are series-connected to the switching elements 51. Therefore, the constant of the attenuating direct current component contained in the current flowing through the short-circuit unit 50 decreases. Consequently, the time that the current value takes to fall below the predetermined current value is shortened, so that the short-circuit unit 50 can be halted early. However, if the resistor 52 has high resistance, high voltage is applied to the inverter 30 during operation of the short-circuit unit 50. Therefore, it is preferable that the resistance of the resistor 52 be set to a value at which that voltage does not exceed the second predetermined value.

After Step S7, the determination unit 81 determines whether the operation of the wound induction machine 10 should be continued (Step S8). For example, in the case where the wound induction machine 10 is connected to an electric power system 300 through a single circuit breaker 90, power transmission cannot be achieved when the circuit breaker 90 separates the wound induction machine 10 from the electric power system 300. For this reason, the determination unit 81 selects the halt of the operation of the wound induction machine 10. In this case, the command unit 82 instructs the drive circuits 70 to 72 to halt the converter 20, the inverter 30, and the chopper 40.

On the contrary, in the case where multiple circuit breakers 90 are parallel-connected to the electric power system 300, in case of a short-circuit of the electric power system 300, one of the multiple circuit breakers 90 is separated from the electric power system 300 while the other circuit breakers 90 remains connected to the electric power system 300. Accordingly, when the electric power system 300 returns to the normal state, the determination unit 81 selects the continuation of the operation of the wound induction machine 10.

Figure 4:
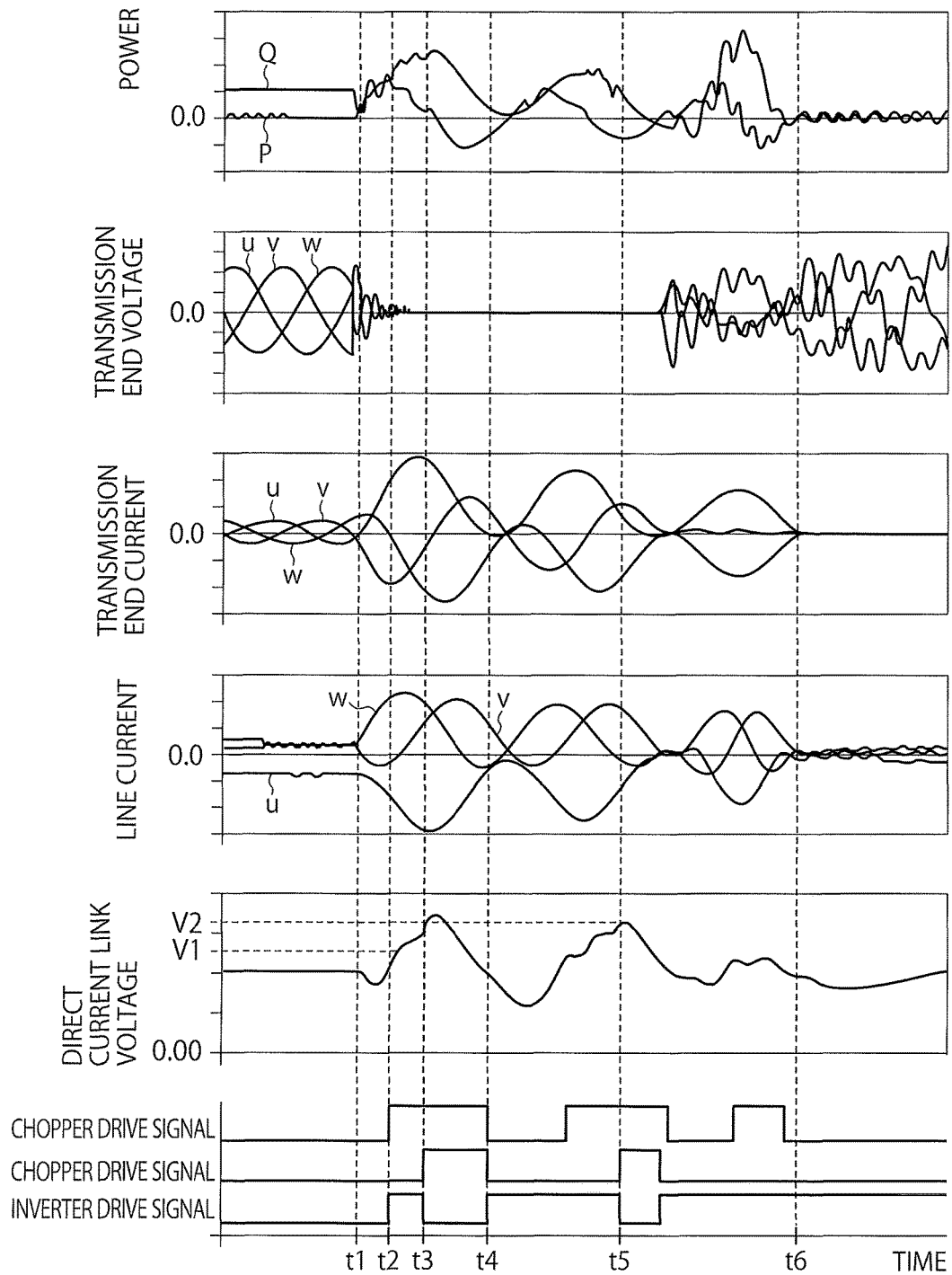
FIG. 4 is a waveform diagram showing the simulation results at an operating point A at which the maximum excitation is obtained.
Figure 5:
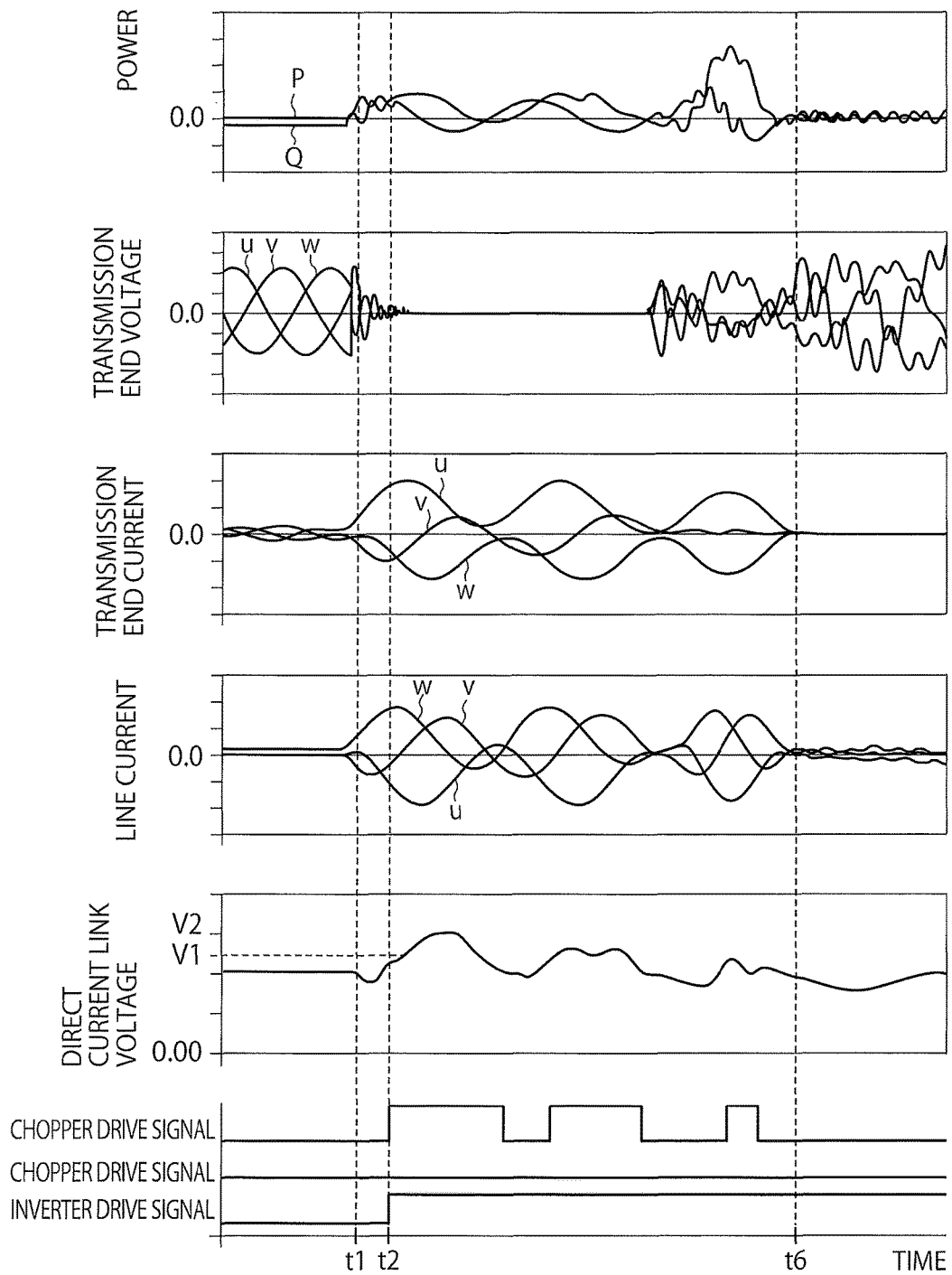
FIG. 5 is a waveform diagram showing the simulation results at an operating point B corresponding to a zero missing limit.
Figure 6:
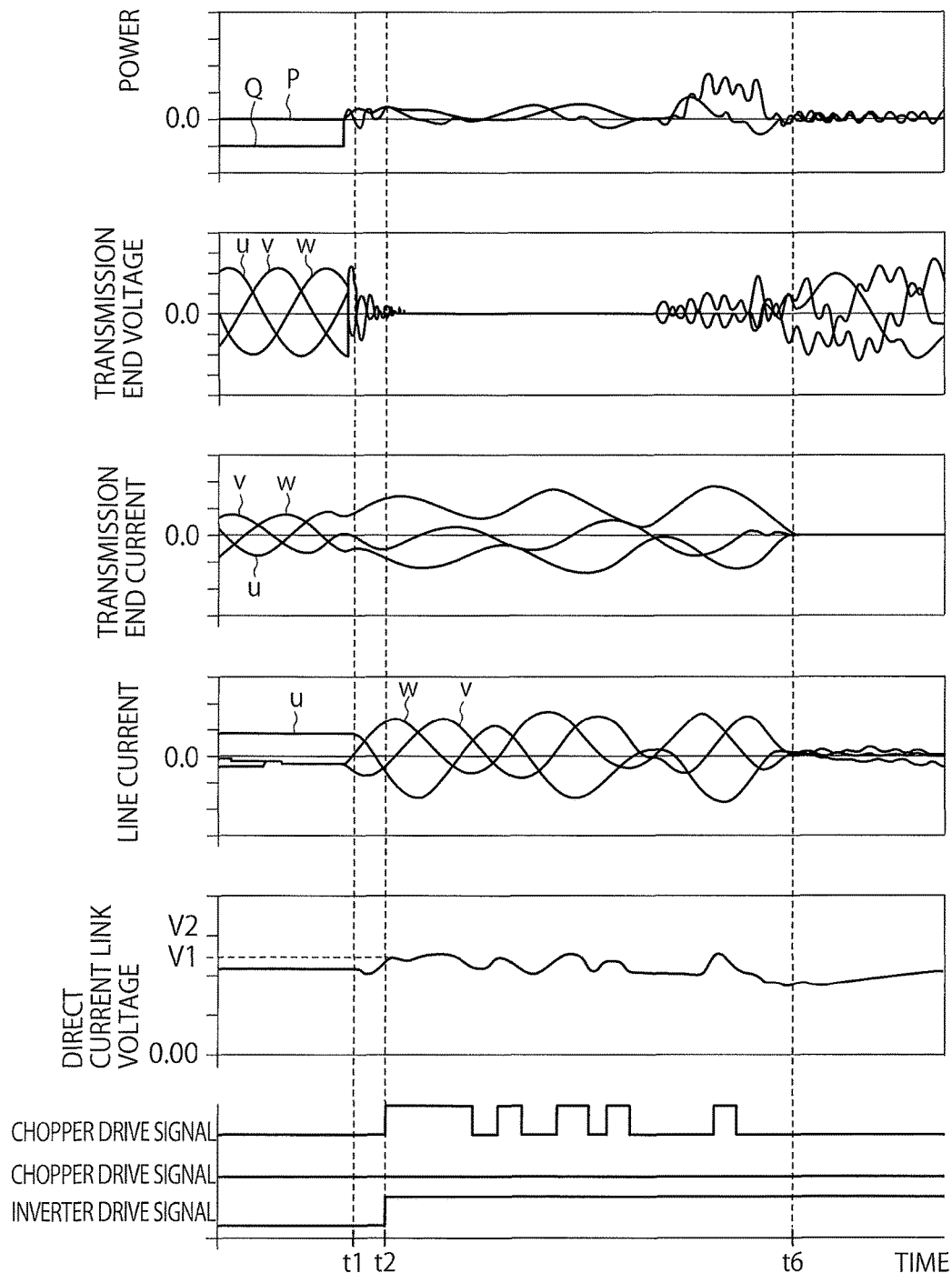
FIG. 6 is a waveform diagram showing the simulation results at an operating point C at which the minimum excitation is obtained.

The simulation results of the above-described operation flow will now be explained for each of the operating points A to C shown in FIG. 2. FIG. 4 is a waveform diagram showing the simulation results at the operating point A at which the maximum excitation is obtained. FIG. 5 is a waveform diagram showing the simulation results at the operating point B corresponding to the zero missing limit. FIG. 6 is a waveform diagram showing the simulation results at the operating point C at which the minimum excitation is obtained.

FIGS. 4 to 6 show the simulation waveforms of active power Q, reactive power P, transmission end voltages, transmission end currents, line currents, and direct current link voltage. The transmission end voltages are the voltages at ends of three-phase transmission wires u, v, and w for connection between the stator 11 and the electric power system 100. The transmission end currents are the currents at the ends of the transmission wires u, v, and w. The line currents are the currents flowing through the wires U, V, and W, that is, the currents detected by the current sensor 61.

According to the simulation results related to the operating point A shown in FIG. 4, a breakdown of the electric power system 100 occurs in the timing t1 and the direct current link voltage increases. Afterwards, if the direct current link voltage exceeds the first predetermined value V1 in the timing t2, the chopper 40 is driven. At the same time, the switching operation of the switching element 31 is changed. Thus, zero missing is prevented.

Afterwards, if the direct current link voltage exceeds the second predetermined value V2 in the timing t3, the short-circuit unit 50 is driven. At the same time, the inverter 30 halts. Afterwards, in the timing t4, the short-circuit unit 50 halts and the inverter 30 restarts at the same time. Subsequently, if the direct current link voltage exceeds the second predetermined value V2 again in the timing t5, the short-circuit unit is driven. Finally, in the timing t6, a zero cross is formed across the transmission end currents, and the wound induction machine 10 is separated from the electric power system 100.

According to the simulation results related to the operating point B shown in FIG. 5, the behaviors in the timings t1 and t2 are substantially the same as those of the operating point A. However, the intensity of excitation at the operating point B is lower than that at the operating point A, so that the direct current link voltage does not increase to the second predetermined value V2. Therefore, the short-circuit unit 50 is not driven. Consequently, in the timing t6, a zero cross is formed across the transmission end currents, and the wound induction machine 10 is separated from the electric power system 100.

According to the simulation results related to the operating point C shown in FIG. 6, the behaviors in the timings t1 and t2 are substantially the same as those of the operating point A. However, the intensity of excitation at the operating point C is lower than that at the operating point B. Thus, the direct current link voltage does not increase to the second predetermined value V2. Therefore, the short-circuit unit 50 is not driven. Accordingly, like at the operating point B, in the timing t6, a zero cross is formed across the transmission end currents, and the wound induction machine 10 is separated from the electric power system 100.

According to the present embodiment described above, within the operation range from the operating point B at which zero missing easily occurs to the operating point C, the chopper 40 is driven and the inverter 30 outputs current over which a direct current component is superimposed. This avoids zero missing.

In addition, during operation at the operating point A at which the direct current link voltage easily increases, the short-circuit unit 50 is driven. This suppresses an increase in the direct current link voltage. Since zero missing does not occur at the operating point A, there is no harm in halting the inverter 30 during the actuation of the short-circuit unit 50.

Driving the short-circuit unit 50 in this manner suppresses an increase in the direct current link voltage while reducing the power consumption of the resistor 42 in the chopper 40, thereby protecting the converter 20 and the inverter 30. Reducing the power consumption of the resistor 42 achieves reductions in the size and cost of the device. Especially in this embodiment, in case of a breakdown of the electric power system 100, the chopper 40 and the inverter 30 are driven before the short-circuit unit 50 is driven. This allows quickly dealing with zero missing.

In this embodiment, the length of the time that breakdown current flows through the inverter 30 is as short as several tens to hundreds of milliseconds. For this reason, the controller 80 may temporarily increase the predetermined current value only in the period in which the inverter 30 outputs alternating current over which a direct current component is superimposed, that is, the period between Step S2 and Step S3. When the predetermined current value is high, the current output from the inverter 30 is more effective in preventing zero missing. An increase in the direct current link voltage is also suppressed, which contributes to a reduction in the power consumption of the chopper 40.

In addition, in the chopper 40, multiple switching elements 41 may be parallel-connected and each switching element 41 may be series-connected to the resistor 42. In this embodiment, the resistance of the resistor 42 is set to a value that does not cause the short-circuit unit 50 to be driven at the operating point B corresponding to the zero missing limit line. For this reason, at the operating point C at which the minimum excitation is obtained, the resistance of the resistor 42 can be excessively high. Therefore, at the operating point C, the command unit 82 in the controller 80 instructs the drive circuit 72 to partially drive the switching element 41. The resistor 42 used at this time can be at high temperature. Accordingly, in the case where a breakdown of the electric power system 100 occurs twice in a row, a resistor 42 which is not used upon the first breakdown is used upon the second breakdown, which allows quickly dealing with a system breakdown. The number of times of occurrence of breakdown of the electric power system 100 is measured by the counter 84 in the controller 80. In case of a breakdown of the electric power system 100, the state of the circuit breaker 90 changes. Accordingly, the counter 84 measures the number of times of occurrence of breakdown of the electric power system 100 in accordance with changes in the state of the circuit breaker 90.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

The invention claimed is:

1. A control system of a wound induction machine, comprising:
    a chopper to reduce a direct current voltage between a converter connected to a stator in the wound induction machine and an inverter connected to a rotor in the wound induction machine;
    a short-circuit unit to short a wire used for connection between the rotor and the inverter;
    a voltage detector circuit to detect the direct current voltage; and
    a controller to cause driving the chopper and, at the same time, outputting from the inverter an alternating current superimposed over a direct current component when a voltage value input from the voltage detector circuit exceeds a first predetermined value, and to cause driving the short-circuit unit and, at the same time, halting the inverter when the voltage value exceeds a second predetermined value higher than the first predetermined value.

2. The control system according to claim 1, further comprising a current sensor to detect line current flowing through the wire, wherein
    when one circuit breaker is connected between the stator and an electric power system, the controller causes the wound induction machine to halt after the current value of the line current falls below a predetermined current value, and
    when any one of the multiple circuit breakers is connected between the stator and the electric power system, the controller causes the wound induction machine to continue operating after the current value falls below the predetermined current value.

3. The control system according to claim 2, wherein the controller temporarily increases the predetermined current value from the time at which both the chopper and the inverter are driven in accordance with the first predetermined value to the time at which the short-circuit unit is driven in accordance with the second predetermined value.

4. The control system according to claim 1, wherein the short-circuit unit includes a short-circuit switching element across the wire, and a current limit resistor series-connected to the short-circuit switching element.

5. The control system according to claim 1, wherein
    the chopper includes a chopper switching element and a chopper resistor series-connected to the chopper switching element, and
    the resistance of the chopper resistor is set to a value at which the voltage value does not exceed the second predetermined value.

6. A control method for a wound induction machine including a stator connected to an electric power system through at least one circuit breaker, and a rotor provided in the stator, the control method comprising:

detecting a direct current voltage between a converter connected to the stator and an inverter connected to the rotor;

driving a chopper to reduce the direct current voltage and, at the same time, outputting from the inverter an alternating current over which a direct current component is superimposed when the detected voltage value exceeds a first predetermined value; and shorting a wire used for connection between the rotor and the inverter and, at the same time, halting the inverter when the voltage value exceeds a second predetermined value higher than the first predetermined value.

7. A controller for a wound induction machine including a stator connected to an electric power system through at least one circuit breaker, and a rotor provided in the stator, the controller comprising:

a determination unit to determine whether a voltage value corresponding to a direct current voltage between a converter connected to the stator and an inverter connected to the rotor exceeds a first predetermined value, and whether the voltage value exceeds a second predetermined value higher than the first predetermined value; and a command unit to cause driving a chopper which reduces the direct current voltage and, at the same time, outputting from the inverter an alternating current over which a direct current component is superimposed when the determination unit determines that the voltage value exceeds the first predetermined value, and to cause driving a short-circuit unit which shorts a wire used for connection between the rotor and the inverter and, at the same time, halting the inverter when the determination unit determines that the voltage value exceeds the second predetermined value.

\* \* \* \* \*